US008582493B2

(12) United States Patent
Li et al.

(10) Patent No.: US 8,582,493 B2
(45) Date of Patent: Nov. 12, 2013

(54) IMPLICIT WIRELESS RELAY STATION BASED UPON OBSERVED COMMUNICATIONS BETWEEN A SUBSCRIBER STATION AND A BASE STATION

(75) Inventors: Qinghua Li, San Ramon, CA (US); Ozgur Oyman, San Jose, CA (US); Wendy C. Wong, San Jose, CA (US); Yuan Zhu, Beijing (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 12/781,472

(22) Filed: May 17, 2010

(65) Prior Publication Data

US 2011/0280174 A1 Nov. 17, 2011

(51) Int. Cl.
*H04B 7/14* (2006.01)
*H04B 15/00* (2006.01)
*H04J 1/16* (2006.01)
*H04L 1/00* (2006.01)
*H04W 4/00* (2009.01)

(52) U.S. Cl.
USPC .......... 370/315; 370/235; 370/236; 370/327; 370/328; 455/522

(58) Field of Classification Search
USPC ........................................ 370/315, 327, 311
See application file for complete search history.

(56) References Cited

U.S. PATENT DOCUMENTS

| 5,983,073 | A * | 11/1999 | Ditzik .......................... 455/11.1 |
| 7,643,793 | B2 * | 1/2010 | Park et al. ........................ 455/16 |
| 7,984,356 | B2 * | 7/2011 | Chindapol et al. ............. 714/748 |
| 2008/0049718 | A1 * | 2/2008 | Chindapol et al. ............. 370/351 |
| 2008/0056173 | A1 * | 3/2008 | Watanabe ...................... 370/315 |
| 2008/0160951 | A1 * | 7/2008 | Dominique et al. ........ 455/343.1 |
| 2009/0325480 | A1 * | 12/2009 | Ji et al. .............................. 455/8 |
| 2010/0088568 | A1 * | 4/2010 | Larsson ........................ 714/751 |
| 2010/0208833 | A1 * | 8/2010 | Lee ................................ 375/267 |
| 2011/0273999 | A1 * | 11/2011 | Nagaraja ....................... 370/252 |

FOREIGN PATENT DOCUMENTS

JP 2009-188926 * 8/2009

* cited by examiner

*Primary Examiner* — Yemane Mesfin
*Assistant Examiner* — Peter Chen
(74) *Attorney, Agent, or Firm* — Schwegman Lundberg & Woessner, P.A.

(57) ABSTRACT

Disclosed in some examples is a method performed by a relay station, the method including receiving at a relay station a data packet transmitted from a base station to a subscriber station; receiving a non-acknowledgement (NACK) message transmitted from the subscriber station to the base station in response to the data packet; receiving resource allocation information transmitted from the base station to the subscriber station; and transmitting, in response to the received NACK message at the transmission time, the data packet to the subscriber station in a resource allocation allocated for a retransmission of the data packet from the base station to the subscriber station, wherein the resource allocation is determined from the resource allocation information.

18 Claims, 6 Drawing Sheets

WIRELESS NETWORK

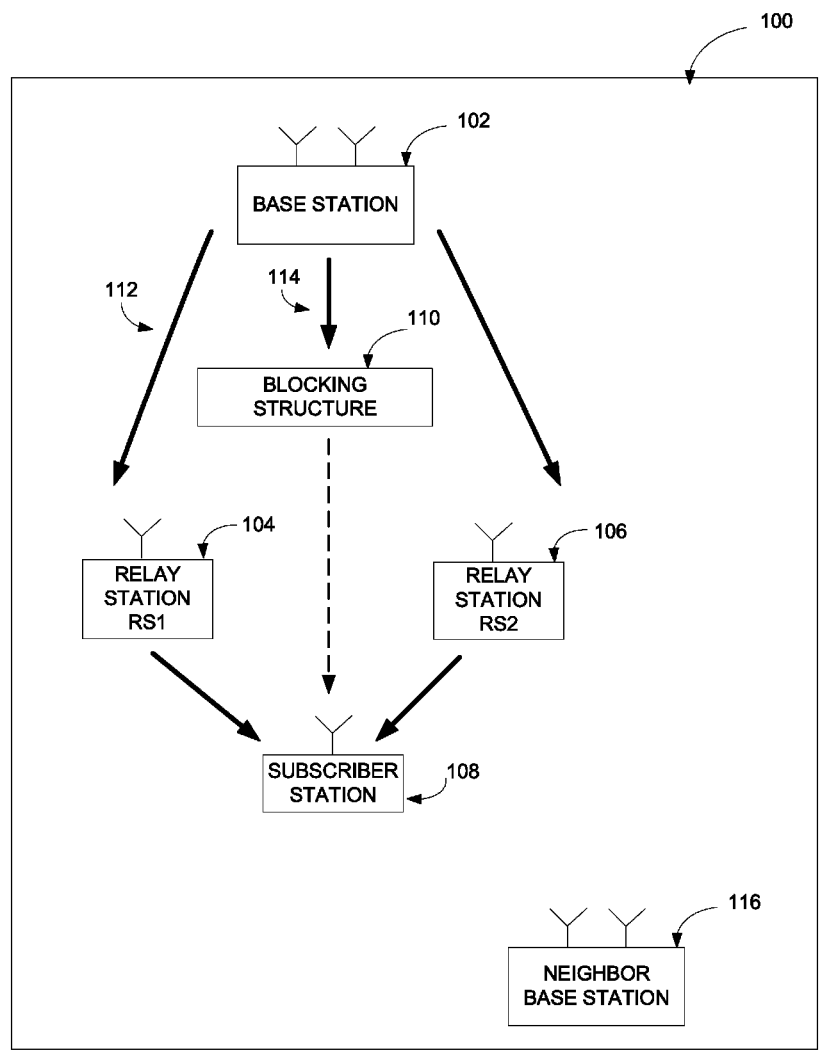
FIG. 1 – WIRELESS NETWORK

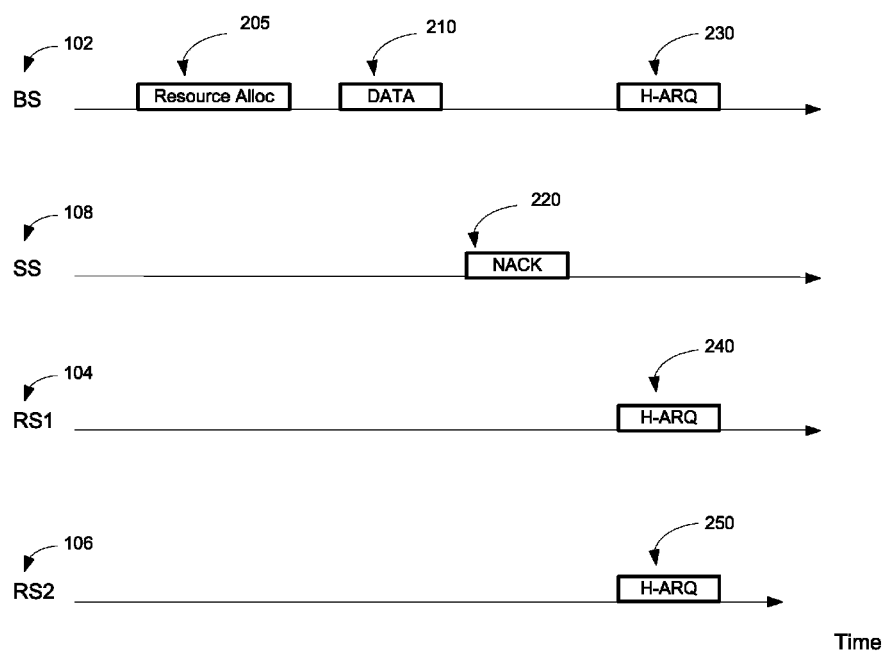
FIG. 2 – TRANSMISSION TIMELINE

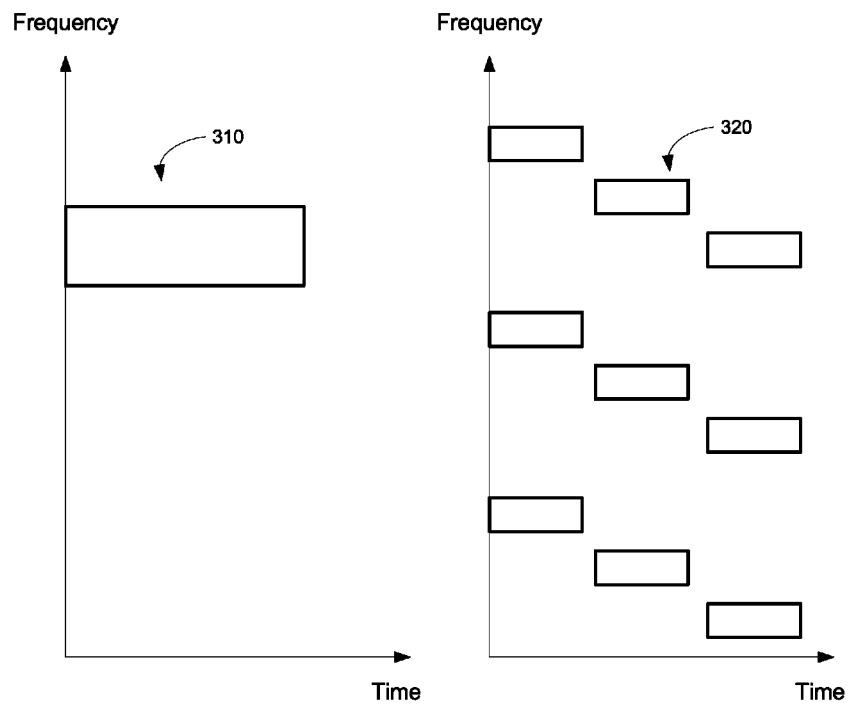
FIG. 3 – LOCALIZED AND DISTRIBUTED
RESOURCE ALLOCATION

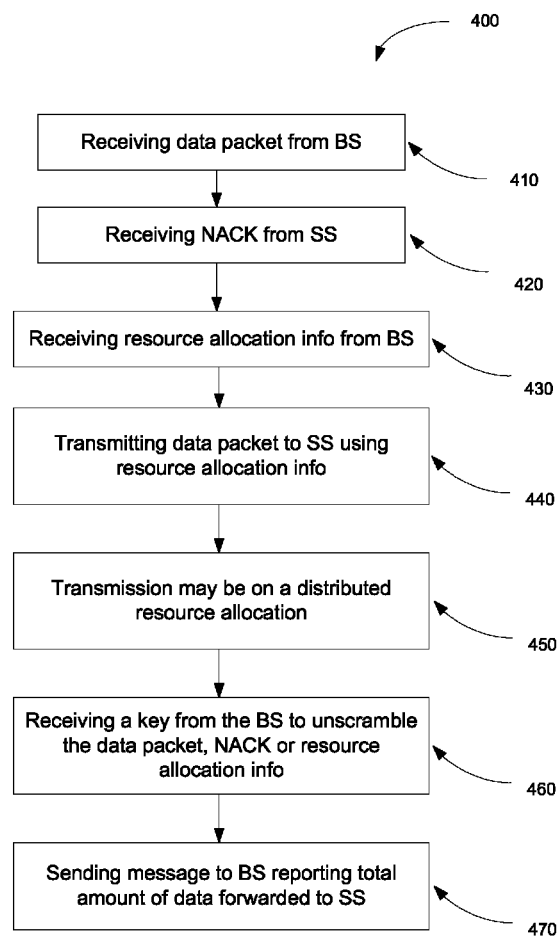
FIG. 4 – DOWNLINK RELAY

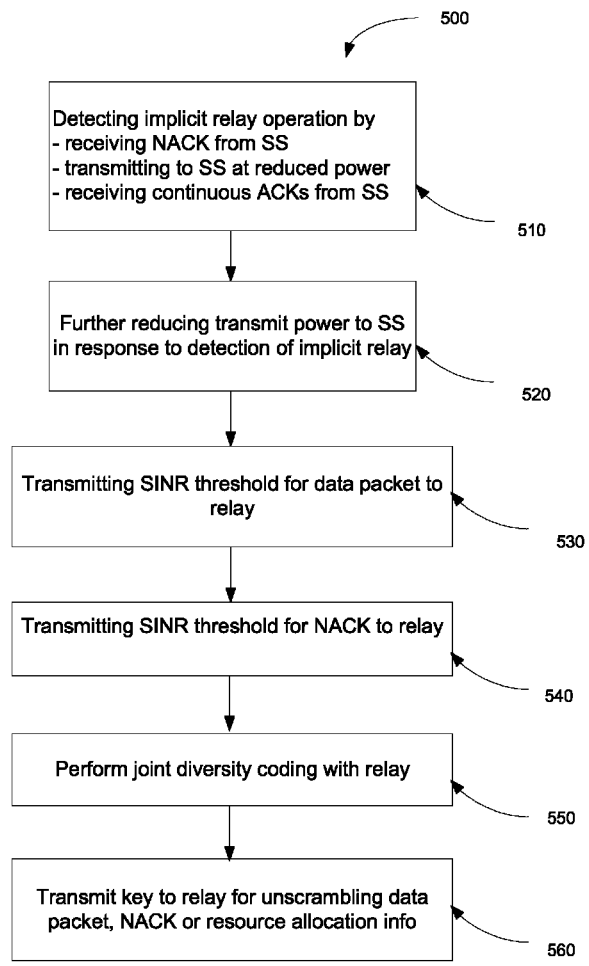
FIG. 5 – BS SUPPORTING RELAY

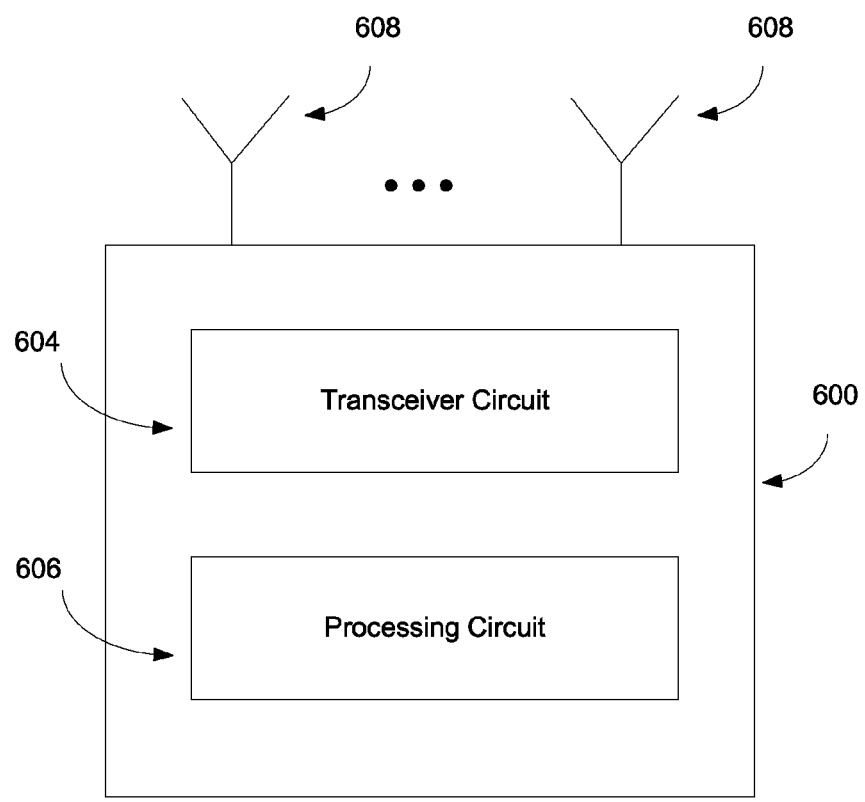
FIG. 6 – RELAY STATION

IMPLICIT WIRELESS RELAY STATION BASED UPON OBSERVED COMMUNICATIONS BETWEEN A SUBSCRIBER STATION AND A BASE STATION

TECHNICAL FIELD

Various embodiments described herein relate to apparatus, and methods associated with wireless communication. Some embodiments relate to Worldwide Interoperability for Microwave Access (WiMAX) networks and 3rd Generation Partnership Project (3GPP) Long-Term-Evolution (LTE) networks. Some embodiments relate to communications, data transmission and relay techniques between base stations (BS) and subscriber stations (SS).

BACKGROUND

In the wireless environment where subscriber stations may be located near the edge of the coverage area, co-channel interference from a neighboring base station can limit performance. This issue may be exacerbated by shadow fading, where interposing structures or terrain can block the direct transmission path from a serving base station to a subscriber station. Currently, relay stations may be used to improve transmission quality. These relay stations may be other subscriber stations or scaled down base stations. One issue with this approach is the overhead to allocate resources and maintain the relay links. There are also security issues with this approach.

Thus, there are general needs for apparatus and efficient methods to relay data between a base station and subscriber station. There are also general needs to relay data with reduced overhead and lower transmission power while maintaining security.

BRIEF DESCRIPTION OF THE DRAWINGS

FIG. 1 illustrates a base station, relay stations and subscriber station of a wireless network in accordance with some embodiments;

FIG. 2 illustrates a transmission timeline between the base station, relay stations and subscriber station, in accordance with some embodiments;

FIG. 3 illustrates localized and distributed resource allocation, in accordance with some embodiments;

FIG. 4 illustrates a procedure for a downlink relay in accordance with some embodiments;

FIG. 5 illustrates a procedure for base station support of a relay in accordance with some embodiments; and FIG. 6 illustrates a functional block diagram of a relay station in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a base station, relay stations and subscriber station of a wireless network in accordance with some embodiments. Wireless network 100 includes a base station (BS) 102, one or more relay stations (RS1) 104, (RS2) 106, a subscriber (or mobile) station (SS) 108 and a neighbor base station 116. In some embodiments, the wireless network 100 may be a Worldwide Interoperability for Microwave Access (WiMAX) network, although this is not a requirement. In some embodiments, the wireless network 100 may be a 3rd Generation Partnership Project (3GPP) Long-Term-Evolution (LTE) network, although this is not a requirement. In some embodiments, SS 108 may be configured to receive signals in accordance with the IEEE 802.16x standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions. For more information with respect to LTE standards, see the 3rd Generation Partnership Project (3GPP) standards for UTRAN-LTE, release 8, March 2008, including variations and evolutions thereof.

The direct path signal 114 from BS 102 to SS 108 may be attenuated by blocking structure 110. Additionally, SS 108 may receive co-channel interference from neighbor base station 116. RS1 104, however, may receive a strong signal 112 from BS 102. RS1 104 may also be closely located to SS 108 or otherwise enjoy an acceptable transmission path to SS 108. In this case RS1 104 may forward data from BS 102 to SS 108 on a downlink path. Similarly, RS1 104 may forward data from SS 108 to BS 102 on an uplink path. Any number of alternative relay stations, for example RS2 106, may also perform this relay service. This may be preferable to increasing the transmission power of BS 102 since that may increase interference in neighboring cells. The relay stations which may have lower antenna height, lower transmission power and may be located closer to SS 108, may be less likely to cause interference in neighboring cells.

Forwarding messages may be inefficient, however, due to the increased control signalling overhead and resource sharing necessary for this cooperative scheme between the BS 102 and the relay stations 104, 106. Additionally, there may be security concerns with this method.

FIG. 2 illustrates a transmission timeline between the base station, relay stations and subscriber station, in accordance with some embodiments. The transmission timeline depicts an efficient method for an implicit relay of data between BS 102 and SS 108 in accordance with some embodiments, where the base station may not need to identify the cooperating relay stations and may operate as if there were no relay stations.

The base station 102 sends resource allocation information 205 and a data packet 210 to the subscriber station 108. Due to co-channel interference and/or a shadow effect the subscriber station may receive a corrupted packet and respond with a non-acknowledgment (NACK) 220. Relay stations RS1 104 and RS2 106, which may be in idle mode, may overhear the resource allocation information 205, data packet 210 and NACK packet 220. After receiving the NACK, the base station may retransmit the data packet. The retransmission may be a hybrid automatic repeat request (H-ARQ) packet 230. The relay stations may realize that a retransmission is necessary, based on the overheard NACK 220. One or both of the relay stations 104, 106 may generate the same retransmission packet as the base station and may transmit them on the same frequency and time allocation, using the overheard data packet and the overheard allocation information. The retransmission packets from RS1 104 and/or RS2 106 may also be H-ARQ packets 240, 250.

Thus, the received signal power at the subscriber station may be boosted by the retransmission from RS1 104 and/or RS2 106 and the subscriber station may enjoy a better communications link. In this sense, the relay stations may be considered to act as a power booster rather than a conventional relay. The base station may treat the relay stations as part of a multipath channel, like a reflective object with a long delay memory. This may allow for the base station to merely adapt to the multipath channel rather than having to control the relay stations.

In some embodiments, the operator of the relay stations 104, 106 may get incentives for performing the implicit relay. The operator may need to certify the relay stations so that they automatically perform the relay function when they have surplus power supply.

FIG. 3 illustrates localized and distributed resource allocation, in accordance with some embodiments. In accordance with some embodiments, the retransmission may be restricted to a localized resource allocation in frequency and time 310. In these embodiments, the signals of the base station and the relay stations may cause destructive interference or fading which may result in poor signal quality at the subscriber station. This effect may be exacerbated in the absence of spatial diversity. In accordance with some embodiments, the retransmission may be distributed over multiple frequency and time subbands 320 so that the received power at the subscriber station may be more stable and result in higher signal quality. The improvement may be by a factor of N, where N is the number of multipath reflections. Since the base station and the relay station transmit the same signal to the subscriber station, the data symbols and pilot symbols may be aligned and the subscriber station may perceive the aggregate channel response that needs to be estimated for demodulating data symbols.

FIG. 4 illustrates a procedure for a downlink relay in accordance with some embodiments. Procedure 400 may be performed by a relay station, such as relay station 104 (FIG. 1). Operation 410 comprises receiving a data packet transmitted from the base station to a subscriber station. Operation 420 comprises receiving an NACK transmitted from the subscriber station to the base station. Operation 430 comprises receiving resource allocation information transmitted from the base station to the subscriber station. Operation 440 comprises transmitting the data packet to the subscriber station using the resource allocation information. This transmission may be on a distributed resource allocation 450. Operation 460 comprises receiving a key from the base station which may be used to decode a data packet, the NACK, or the resource allocation information. Operation 470 comprises sending a message to the base station reporting the total amount of data that has been forwarded to or from the subscriber station.

Since the relay station may be close to the subscriber station, ranging may not be needed between the two. Furthermore, the relay station may infer the timing for the relay transmission using the existing ranging data for its link to the base station and assuming zero distance to the subscriber station.

FIG. 5 illustrates a procedure for base station support of a relay in accordance with some embodiments. Procedure 500 may be performed by a base station, such as base station 102 (FIG. 1). Operation 510 comprises detecting the operation of an implicit relay based on receiving an initial NACK from the subscriber station, performing subsequent transmissions to the subscriber station at reduced power and receiving continuous ACKs from the subscriber station in response to those transmissions. Operation 520 comprises further reducing transmit power to the subscriber station in response to the detection of the implicit relay. Said that base station may cause more interference to the neighboring cell than the relay station due to the higher antenna mounting at the base station, it is desirable to reduce the transmission power of the base station for interference mitigation.

In some embodiments, the base station may transmit a signal to interference plus noise ratio (SINR) threshold for data packets to the relay station at operation 530. In some embodiments, the base station may transmit a signal to interference plus noise ratio (SINR) threshold for NACK to the relay station at operation 540. The participation of relay stations may be optimized by using these signal quality thresholds. This threshold requirement may effectively shrink the number of cooperating relays to only those that are most effective. Qualified relay stations may thus come from the region whose signal quality is good enough to receive both the data packet from the base station and the NACK from the subscriber station.

In some embodiments the base station may perform joint diversity coding with the relay station at operation 550. For example, the base station may send symbols for the first antenna of an Alamouti code and the relay stations may send symbols for the second antenna of the Alamouti code. Additionally, since the base station or the relay station may not need to use all of the available antennas, the extra antennas may be used for further diversity enhancement schemes or for beamforming. MIMO spatial multiplexing may also be used if the effective channel quality of the retransmission is sufficiently high. In some embodiments, the code symbols for the second antenna are predefined in the system to reduce control overhead.

In some embodiments, the base station may transmit a key to the relay station to be used for decoding data packets, NACKs or resource allocation information. For security purposes, scrambling may still be applied to the data since the relay station only needs to decode the scrambled data.

In some embodiments, only trusted devices may be allowed to overhear even the scrambled data and NACK. Subscriber stations may have a list of trusted subscribers stored at the base station. The base station may then grant the key only to the trusted subscribers.

Although the individual operations of procedure 400 and 500 are illustrated and described as separate operations, one or more of the individual operations may be performed concurrently, and nothing requires that the operations be performed in the order illustrated. Furthermore, some operations may be optional.

FIG. 6 illustrates a functional block diagram of a relay station in accordance with some embodiments. Relay station 600 may include transceiver circuitry 604 and processing circuitry 606. Transceiver circuitry 604 may be coupled to one or more antennas 608 for transmitting and receiving signals from base stations, such as base station 102 (FIG. 1) and subscriber stations, such as subscriber station 108 (FIG. 1). Relay station 600 may be suitable for use as any of relay stations 104 and 106 (FIG. 1).

In accordance with some embodiments, the relay station 600 may be configured to operate in a wireless packet-carrying network. In these embodiments, the transceiver circuit 604 may receive a data packet, an NACK and resource allocation information transmitted from a base station to a subscriber station. The transceiver circuit 604 may further transmit the data packet to the subscriber station in response to the NACK. In these embodiments, the processing circuitry 606 may decode the resource allocation information and set the transmission of the data packet to the subscriber station in a retransmission allocation of the data packet from the base station to the subscriber station using the resource allocation information.

In some embodiments, the transceiver circuit 604 may transmit the data packet to the subscriber station on a distributed resource allocation. In some embodiments, the transceiver circuit 604 may receive a key from the base station and the processing circuit 606 may use the key to decode the data packet, the NACK or the resource allocation information.

In some embodiments, relay station 600 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a smart phone, or other device that may receive and/or transmit information wirelessly.

Antennas 608 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 608 may be effectively separated to take advantage of spatial diversity and the different channel characteristics that may result between each of antennas 608 and the antennas of a transmitting station.

Although relay station 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of relay station 600 may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable medium may include any tangible medium for storing in a form readable by a machine (e.g., a computer). For example, a computer-readable medium may include read-only memory (ROM), random-access memory (RAM), magnetic disk storage media, optical storage media, and flash-memory devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a base station comprising:
   detecting that a relay station is acting as an implicit relay, the implicit relay retransmitting packets sent from the station to a subscriber station based upon overheard wireless communications between the station the subscriber station, the detecting comprising:
   receiving a non-acknowledgement (NACK) from the subscriber station;
   performing further transmissions directly to the subscriber station at reduced transmit power;
   determining that the relay station is acting as the implicit relay responsive to receiving continuous acknowledgements (ACKs) from the subscriber station in response to the further transmissions at reduced transmit power; and
   further reducing transmit power in response to detection of the implicit relay operation.

2. The method of claim 1 wherein when the implicit relay operation is detected, the method further comprises:
   transmitting a signal to interference plus noise ratio threshold for a data packet to the relay station; and
   transmitting a signal to interference plus noise ratio threshold for the NACK to the relay station.

3. The method of claim 1 further comprising:
   performing joint diversity coding with the relay station during the further transmissions.

4. The method of claim 1 further comprising:
   transmitting a key to the relay station, the key used to decode at least one of the data packet, the NACK or resource allocation information.

5. The method of claim 1 wherein the base station operates in accordance with one of: a WiMAX standard and an LTE standard.

6. A method performed by an implicit relay station, the method comprising:
   at the implicit relay station:
   receiving a signal quality metric from a base station;
   overhearing a data packet transmitted from the base station to a subscriber station on a wireless link, the wireless link comprising time and frequency resources allocated by the base station for direct communications between both the base station and the subscriber station;
   overhearing, on the wireless link, a non-acknowledgement (NACK) message transmitted from the subscriber station to the base station in response to the data packet;
   calculating a signal quality of the overheard NACK message;
   acting as the implicit relay station, without a request by the base station, when the signal quality of the overheard NACK message meets or exceeds the signal quality metric by retransmitting the data packet to the subscriber station on the wireless link at a time allocated for retransmission of the data packet by the base station; and
   refraining from acting as the implicit relay station by not retransmitting the data packet when the single quality of the overheard NACK message does not meet the signal quality metric.

7. The method of claim 6 wherein the method further comprises:
   at the implicit relay station:
   receiving a second signal quality metric from the base station;
   calculating a signal quality of the overheard data packet; and refraining from acting as the implicit relay station by not retransmitting the data packet to the subscriber station when the signal quality of the overheard data packet received from the base station is below the second signal quality metric or the signal quality of the overheard NACK message is below the signal quality metric.

8. The method of claim 6 wherein the retransmission of the data packet from the base station to the subscriber station is a hybrid automatic repeat request (H-ARQ).

9. The method of claim 6 further comprising receiving a key at the implicit relay station from the base station, the key used to decode at least one of the data packet, the NACK or the resource allocation information.

10. The method of claim 6 wherein the implicit relay station is a personal computer configured for operating within a wireless network.

11. The method of claim 10 wherein the personal computer performs the implicit relay when in an idle mode or during battery charging.

12. The method of claim 11 further comprising sending a message to the base station reporting a total amount of data forwarded to the subscriber station.

13. The method of claim 6, wherein the retransmission of the data packet by the base station and the relay station at the time allocated for retransmission of the data packet by the base station boosts a received signal power at the subscriber station for the retransmitted data packet.

14. An implicit relay station to operate in a wireless packet-carrying network, the relay station comprising:

A transceiver circuit configured to:
  receive a signal quality metric from a base station;
  overhear a data packet transmitted from the base station to a subscriber station on a wireless link, the wireless link comprising time and frequency resources allocated by the base station for direct communications between both the base station and the subscriber station;
  overhear, on the wireless link, a non-acknowledgement (NACK) message transmitted from the subscriber station to the base station in response to the data packet;
  calculate a signal quality of the overheard NACK message;
  act as the implicit relay station, without a request by the base station, when the signal quality of the overheard NACK message meets or exceeds the signal quality metric by retransmitting the data packet to the subscriber station on the wireless link at a time allocated for retransmission of the data packet by the base station; and
  refrain from acting as the implicit relay station by not retransmitting the data packet when the single quality of the overheard NACK message does not meet the signal quality metric.

15. The implicit relay station of claim 14, wherein the transceiver circuit is further configured to:
  receive a second signal quality metric from the base station;
  calculate a signal quality of the overheard data packet; and
  refrain from acting as the implicit relay station by not retransmitting the data packet to the subscriber station when the signal quality of the overheard data packet received from the base station is below the second signal quality metric or the signal quality of the overheard NACK message is below the signal quality metric.

16. The implicit relay station of claim 14, wherein the transceiver circuit is further configured to: receive a key from the base station, the key used to decode at least one of the data packet, the NACK or the resource allocation information.

17. The implicit relay station of claim 14, wherein the relay station is a personal computer configured for operating within a wireless network.

18. The implicit relay station of claim 14, wherein the retransmission of the data packet by the base station and the relay station at the time allocated for retransmission of the data packet by the base station boosts a received signal power at the subscriber station for the retransmitted data packet.

* * * * *

UNITED STATES PATENT AND TRADEMARK OFFICE
CERTIFICATE OF CORRECTION

PATENT NO. : 8,582,493 B2  
APPLICATION NO. : 12/781472  
DATED : November 12, 2013  
INVENTOR(S) : Li et al.

Page 1 of 1

It is certified that error appears in the above-identified patent and that said Letters Patent is hereby corrected as shown below:

In the Claims

In column 6, line 4, in Claim 1, after "the", insert --base--, therefor

In column 6, line 6, in Claim 1, after "the", insert --base--, therefor

In column 6, line 6, in Claim 1, after "station", insert --and--, therefor

In column 6, line 16, in Claim 1, after "to", insert --the--, therefor

In column 6, line 58, in Claim 6, delete "single" and insert --signal--, therefor In column 8, line 14, in Claim 14, delete "single" and insert --signal--, therefor Signed and Sealed this  
Sixth Day of May, 2014

Michelle K. Lee  
*Deputy Director of the United States Patent and Trademark Office*